United States Patent
Furumiya et al.

(10) Patent No.: US 6,195,320 B1
(45) Date of Patent: Feb. 27, 2001

(54) OPTICAL DISK SIGNAL PROCESSING METHOD AND OPTICAL DISK DEVICE

(75) Inventors: Shigeru Furumiya, Himeji; Yuji Hisakado, Osaka, both of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/210,808

(22) Filed: Dec. 15, 1998

(30) Foreign Application Priority Data

Dec. 15, 1997 (JP) .................................................. 9-343495
Jun. 26, 1998 (JP) ................................................ 10-179459

(51) Int. Cl.$^7$ ........................................................ G11B 7/00
(52) U.S. Cl. ................................................ 369/48; 369/59
(58) Field of Search ........................ 369/48, 59, 124.01, 369/124.09

(56) References Cited

U.S. PATENT DOCUMENTS

| | | | |
|---|---|---|---|
| 5,058,093 | * 10/1991 | Mukai | ................................ 369/59 X |
| 5,365,505 | * 11/1994 | Fuji | ................................... 369/590 R |
| 5,377,054 | * 12/1994 | Yamaguchi et al. | ................ 369/59 X |
| 5,684,774 | * 11/1997 | Yamamuro | ......................... 369/590 R |
| 6,058,087 | * 5/2000 | Tomita | .............................. 369/590 R |

* cited by examiner

*Primary Examiner*—Aristotelis M. Psitos
(74) *Attorney, Agent, or Firm*—Parkhurst & Wendel, L.L.P.

(57) ABSTRACT

A method and a device of processing a signal to solve the problem that a multi-bit and high-speed A/D converter for converting an analog regenerated signal into a digital signal on an optical disk is costly. In the method of processing a signal using a sum signal (22) or a difference signal (7) of a plurality of electric signals detected by an optical detection unit (4), an ID signal and a recording signal contained in the sum signal or the difference signal are selected and time-multiplexed, the polarity of the ID signal is adjusted to the polarity of the recording signal, the DC levels of the polarity-adjusted ID signal and recording signal are controlled and maintained at a constant level, and a series of the polarity- and DC-level-adjusted signals are A/D converted. Thus, the dynamic range of the multiplexed signal is reduced, and both the sum and the difference signals are digitized by a single A/D converter having the minimum number of bits.

6 Claims, 10 Drawing Sheets

OPTICAL DISK SIGNAL PROCESSING METHOD AND OPTICAL DISK DEVICE

FIELD OF THE INVENTION

The present invention relates to a method of processing a signal for an optical disk for regenerating a rewritable optical disk, and to an optical disk device.

BACKGROUND OF THE INVENTION

A high-density information record can be regenerated on a rewritable optical disk. Therefore, the rewritable optical disk has been developed and put for sale on a commercial basis as a external storage device to a computer and an AV disk for images and voice. A groove (guide line) and a land (between grooves) are made on a high-density rewritable optical disk for tracking control of an optical beam. The well-known land-groove recording technology records and regenerates information on both lands and grooves.

As for an optical disk, a sector is a unit for recording information and is obtained by sectioning a disk of a record track for each amount of information. The header of each sector contains an ID signal preliminarily storing an address of the sector and various generally attributes. In the land-groove recording, an ID signal is provided between the adjacent land and groove so that the ID signal can be read from both land and groove. The Inventor and his associates have developed the ID detection circuit of an optical disk capable of correctly detecting the position and polarity of the ID signal (International Publication No. WO 97/39444).

In regenerating a signal of an optical disk, a very small signal, called a pit or a mark formed on a disk, equal to or smaller than 1 micron is irradiated by a spot light of a laser beam, and the intensity of a reflected light is read. Even if data is digitally stored, a regenerated waveform becomes an analog signal having an intermediate value by the optically or electrically low band passing frequency characteristic of a regeneration system. Therefore, an optical disk regeneration device requires an A/D conversion circuit for converting an analog regenerated signal into the original digital signal. The Inventor and his associates have already suggested the A/D conversion method for correctly digitizing a signal even if a regenerated signal of an optical disk indicates a fluctuation in amplitude and an asymmetric fluctuation (Japanese Laid-open Unexamined Patent Application No. 10-55621).

There are two major cases in which a regenerated signal of an optical disk is digitized. In the first case, a signal detected as an analog signal is to be returned to an original binary digital signal. In the second case, the quality of a regenerated signal is insufficient, and a true value is estimated from a signal before or after an erroneous point even if an error occurs during the regeneration. That is, to use the optimum decoding, an analog regenerated signal is converted into a multi-bit digital signal using an A/D converter, and then a digital signal process is performed. In the second case, an A/D converter normally having the resolution of 6 or more bits at a high conversion speed of a regeneration channel rate is required.

Among the optical disk devices, a device using a plurality of electric sum signals and difference signals detected by an optical detection unit requires an A/D converter for each of a sum signal and a difference signal. Even an optical disk device using only sum signals detects an offset at a DC level of a signal in the ID signal unit and a record signal unit. Especially, since a difference signal is detected with bi-polarity, a dynamic range of the circuit at the previous stage is required to A/D convert these signals as is. Additionally, the number of bits of the A/D converter should be increased. A multi-bit and high-speed A/D converter requires a special process in production, thereby causing a large power consumption as well as a costly system. The present invention has been developed to solve the above described problems, and aims at providing an optical disk signal processing method for digitizing a regenerated signal of a rewritable optical disk using a single A/D converter having the minimal number of bits, and an optical disk device thereby.

DISCLOSURE OF THE INVENTION

To attain the above described purpose, in the method of processing a signal of an optical disk using a plurality of electric sum or difference signals detected by an optical detection unit, the present invention selects an ID signal and a record signal contained in the sum signal or the difference signal for time-multiplexing, adjusts the polarity of the ID signal to the polarity of the record signal, controls the DC levels of the polarity-adjusted ID signal and record signal to be constant, processes the ID signal and the record signal into a series of signals whose polarity and DC level are adjusted, and then A/D converts the signals. Thus, the dynamic range of a multiplexed signal can be reduced, and both the sum and difference signals can be digitized using a single A/D converter having the minimal number of bits.

BRIEF DESCRIPTION OF THE DRAWINGS

FIGS. 3(a)–(i) shows the signal waveform of the optical disk device according to the first embodiment of the present invention;

FIGS. 4(a)–(m) shows the signal waveform of a gate generation unit according to the first embodiment of the present invention;

FIGS. 5(a)–(k) shows the signal waveform of the optical disk device according to the second embodiment of the present invention;

FIGS. 8(a)–(f) shows the signal waveform of the optical disk device according to the third embodiment of the present invention;

FIGS. 10(a)–(c) shows the signal waveform of the optical disk device according to the fourth embodiment of the present invention.

DESCRIPTION OF THE EMBODIMENTS

First Embodiment

Figure 1:
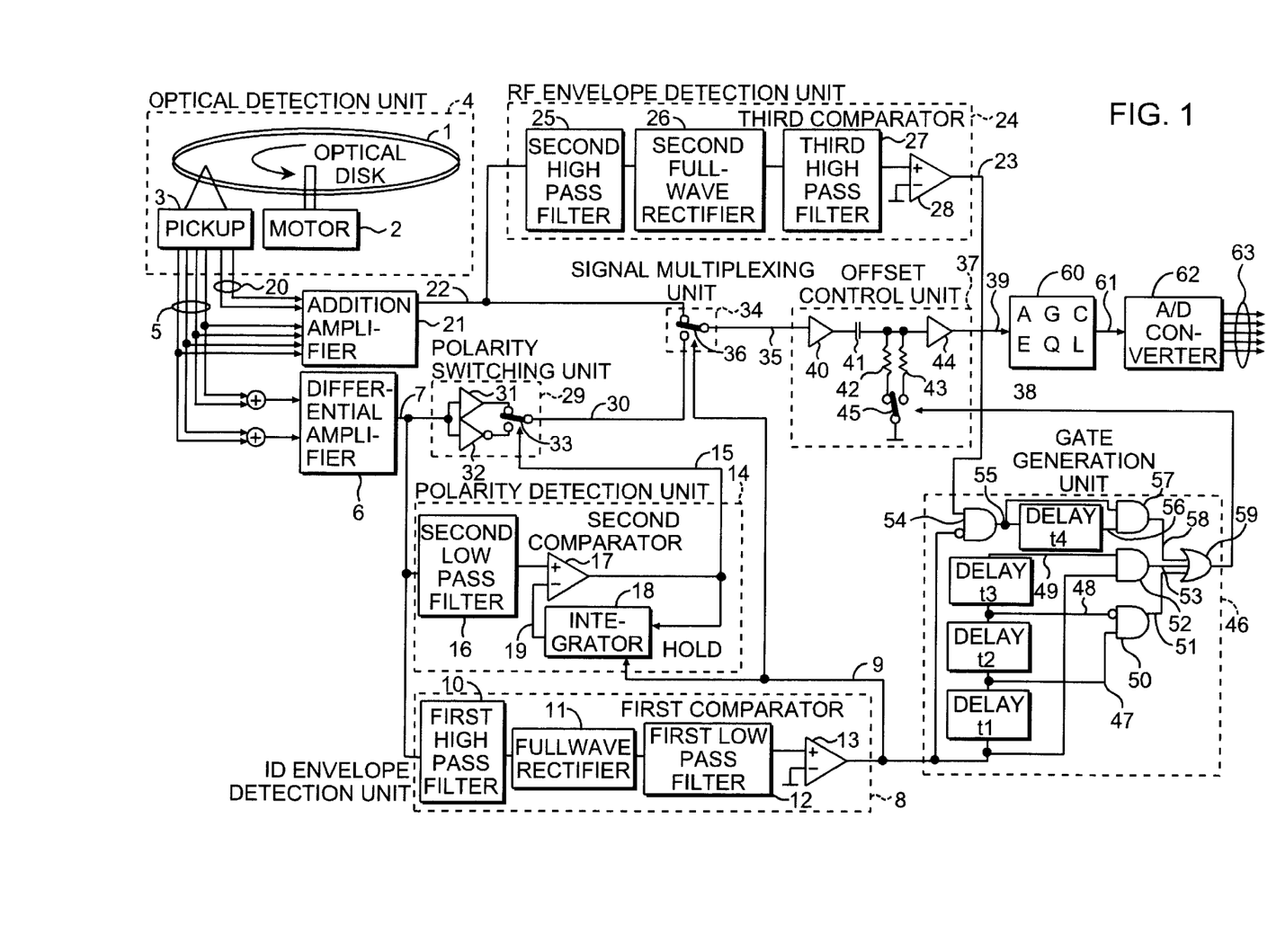
FIG. 1 shows the configuration of an optical disk device according to a first embodiment of the present invention.

FIG. 1 shows the optical disk device according to the first embodiment of the present invention, and FIG. 3 shows the signal waveform.

In FIG. 1, an optical detection unit 4 comprises an optical disk 1, a motor 2 for driving the optical disk 1, and a pickup 3 for reading a signal from the optical disk 1. The optical disk 1 is a rewritable optical disk in a land-groove recording system having a phase change film with an ID signal preliminarily positioned at the head of a sector and at the boundary between the land and the groove as an embossing bit. After the ID signal, a record signal as a crystal or non-crystal mark is used on both land and groove. In the pickup 3, a spot light of laser beams under focus and tracking control is irradiated on the land or groove of the optical disk 1. A reflected light from the optical disk 1 is received by a plurality of pin diodes, and each light is converted into an electric signal and output. In the plurality of electric signals, a difference signal 7 is generated by a differential amplifier 6 which receives a tracking signal 5. The difference signal 7 has a leading ID signal as shown by (c) in FIG. 3, and is followed by a warble signal having a single frequency. The ID signal contains two portions having different polarities, and the header of each portion is provided with a synchronizing VFO signal. FIG. 3 shows the VFO portion by diagonal lines, and the polarity of the signal by an arrow.

The difference signal 7 is input to an ID envelope detection unit 8 which outputs an ID envelope signal 9. The ID envelope signal 9 indicates a high level only at the portion of the ID signal contained in the difference signal (c) as shown by (d) in FIG. 3. Described below is a practical example of the ID envelope detection unit 8.

First, the difference signal 7 is input to a first high pass filter 10. A high frequency ID signal passes, but a low frequency warble signal is interrupted. Then, the envelope voltage of the ID signal is detected by a full-wave rectifier 11 and a first low pass filter 12. The envelope voltage is compared with a reference voltage by a first comparator 13, and a binarized ID envelope signal 9 is output.

The difference signal 7 is input to a polarity detection unit 14 which outputs a polarity signal 15. The polarity signal 15 indicates the polarity of the ID signal as a high or low level in the ID signal portion contained in the difference signal (c) as shown by (e) in FIG. 3, and comprises a binary pulse in the warble signal portion.

Described below is a practical example of the polarity detection unit 14.

First, the difference signal 7 is input to a second low pass filter 16, the high frequency element is removed from the ID signal, the polarity of the low frequency element is extracted, and the noise element is removed from the low frequency warble signal which is thereby passed. Then, this signal is compared with a follow-up slice voltage 19 described later by a second comparator 17, and a binarized polarity signal 15 is output. The polarity signal 15 is input to an integrator 18, and the follow-up slice voltage 19 is output to the second comparator 17 such that the average time of the high and low levels of the polarity signal 15 can be constant. However, since the period of the ID signal is longer than the cycle of the warble signal, the integrator 18 holds the integrating operation using the ID envelope signal 9 indicating the ID signal period for stable control.

Next, a sum signal 22 is generated by an addition amplifier 21 for receiving all signals of a focus signal 20 and a tracking signal 5 which are a plurality of electric signals output by the optical detection unit 4. The sum signal 22 has a leasing ID signal as shown by (a) in FIG. 3, and is followed by the record data stored in a crystal/non-crystal state on the record track of the land or groove. The recording signal is assigned a synchronizing VFO signal as a header.

In FIG. 1, the sum signal 22 is input to an RF envelope detection unit 24 for outputting an RF envelope signal 23.

The RF envelope signal 23 indicates a high level only in the portion having the ID signal and the recording signal contained in the sum signal (a) as shown by (b) in FIG. 3. Described below is a practical example of the RF envelope detection unit 24. The configuration of the RF envelope detection unit is the same as that of the ID envelope detection unit 8 described above. The envelope signal of the ID signal and the recording signal is detected from the sum signal 22 using a second high pass filter 25, a second full-wave rectifier 26, and a third low pass filter 27. The envelope voltage is compared with a reference voltage by a third comparator 28, and outputs a binary RF envelope signal 23.

As described above, in the optical disk device according to the first embodiment, the ID envelope signal 9 is output by the ID envelope detection unit 8, and the polarity signal 15 is output by the polarity detection unit 14 from the difference signal 7 generated by the optical detection unit 4 and the differential amplifier 6. In addition, the RF envelope signal 23 is output by the RF envelope detection unit 24 from the sum signal 22 generated by the addition amplifier 21. The embodiment up to this point is described below by showing preferable parameters using numeric data.

The optical disk 1 is a phase variable optical disk covered with a recording film of an alloy of tellurium, germanium, antimony, etc. The base material is layered polycarbonate of 0.6 mm in thickness. It is a land-groove disk having the track pitch of 0.74 $\mu$m.

The optical disk 1 preliminarily has an ID signal recorded at the start of a sector as an embossing bit at the boundary of the land and the groove at the recording line density of 0.41 $\mu$m/bit, and has a recording signal recorded as a non-crystal/crystal mark/space after the ID signal on the land or groove at the same density as the ID signal.

This optical disk 1 is rotated by the motor 2 such that data can be read at the line reading speed of 6 m/s by the pickup 3 provided with a laser having a wavelength of 65 nm. The first high pass filter 10 in the ID envelope detection unit 8 has a cut-off frequency of 1 MHZ while the first low pass filter 12 has a cut-off frequency of 100 KHz.

For the above described disk record/regeneration parameter, the frequency band of the ID signal of the difference signal 7 is about 500 KHz through 10 MHZ, and the frequency of the warble signal is about 160 KHz. In the ID envelope detection unit 8, the warble signal is removed and only the envelope of the ID signal can be successfully detected. The second low pass filter 16 of the polarity detection unit 14 is set to the cut off frequency of 300 KHz, and the gain crossing at the closed loop of the second comparator 17 and the integrator 18 is set to about 4 KHz.

Thus, in the polarity detection unit 14, the polarity of the ID signal at the ID signal portion, and the binary pulse at the warble signal portion can be successfully detected as a polarity signal 15.

Furthermore, the second high pass filter 25 in the RF envelope detection unit 24 has a cut-off frequency of 1 MHZ, and the third low pass filter 27 has a cut-off frequency of 100 KHz. For the above described disk record/regeneration parameter, the frequency band of the ID signal and the recording signal of the sum signal 22 is about 500 KHz through 10 MHZ, and the RF envelope signal 23 becomes a high level at the portion where the ID signal and the recording signal exist.

The above described parameter is not limited to this application, but can be changed within a certain range to realize the present embodiment. Furthermore, when a different record/regeneration parameter of an optical disk, for example, different recording line density and regeneration line speed are used, the cut-off frequency of each filter can be changed in proportional or inversely proportional to them to realize the present embodiment.

Described below is a polarity switching unit 29 shown in FIG. 1.

The polarity switching unit 29 receives a difference signal 7, and outputs an output signal 30 with the polarity of the signal switched using the polarity signal 15. As a result, the output signal 30 is obtained as an inverted signal of the difference signal (c) input when the polarity signal (e) indicates the high level as shown by (f) in FIG. 3, thereby adjusting the bidirectional polarity of the ID signal to one-directional polarity. Although the signal has one-directional polarity, the DC level of the signal is not adjusted.

Described below is a practical example of the polarity switching unit 29.

The difference signal 7 is input to a normal buffer 31 and an inverse buffer 32, and selected and output by a selector 33 according to the polarity signal 15.

Described below is a signal multiplexing unit 34.

The signal multiplexing unit 34 receives the output signal 30 of the polarity switching unit 29 and the sum signal 22, and outputs an output signal 35 selected according to the ID envelope signal 9 and multiplexed into one signal. As a result, in the output signal 35, the ID signal of the output signal (f) input from the polarity switching unit is multiplexed and output when the ID envelope signal (d) indicates the high level, and the recording signal of the input sum signal (a) is multiplexed and output when the ID envelope signal (d) indicates the low level as shown by (g) in FIG. 3. A practical example of the signal multiplexing unit 34 includes a selector 36, and the ID envelope signal 9 is used as a switch signal.

Described below is an offset control unit 37.

The offset control unit 37 receives the output signal 35 from the signal multiplexing unit 34, and outputs an output signal 39 in which DC level of the effective data portion of the signal is controlled and maintained to be constant using a gate signal 38. As a result, the output signal 39 is received with a quick response of the offset unit into a predetermined DC level at the VFO portion at the head of the ID signal or the recording signal when the gate signal (h) indicates the low level, and a predetermined DC level is maintained with a slow response at the effective data portion of the ID signal or the recording signal when the gate signal (h) indicates the high level as shown by (i) in FIG. 3.

Described below is a practical example of the offset control unit 37.

The output signal 35 of the signal multiplexing unit 34 is input to a buffer 40, converted into a low output impedance, and input to a buffer 44 of a high input impedance through a capacitor 41. The input to the buffer 44 is connected to a resistor 42 having a large resistance value and a resistor 43 having a small resistance value. The other end of each of the two resistors is grounded at the reference voltage through a switch 45. The switch 45 is controlled by the gate signal 38.

When the gate signal 38 indicates the low level, the resistor 43 having a smaller value is selected, and the DC level of the input signal is obtained at a high-speed time constant depending on the capacitor 41 and the resistor 43.

On the other hand, when the gate signal 38 indicates the high level, the resistor 42 having a larger value is selected, and the DC level of the input signal is maintained using a low-speed time constant depending on the capacitor 41 and the resistor 42. With the configuration, the output signal 39 can be obtained.

Described next is a gate generation unit 46 for generating the gate signal 38.

The gate generation unit 46 receives the ID envelope signal 9 and the RF envelope signal 23, and generates the gate signal 38 used by the offset control unit 37. The gate signal 38 indicates the low level at the first half portion of the VFO signal at the start of the ID signal or the recording signal of the output signal (g) of the signal multiplexing unit, and indicates the high level at the second half portion through effective data as shown by (h) in FIG. 3.

Figures 4A, 4M:
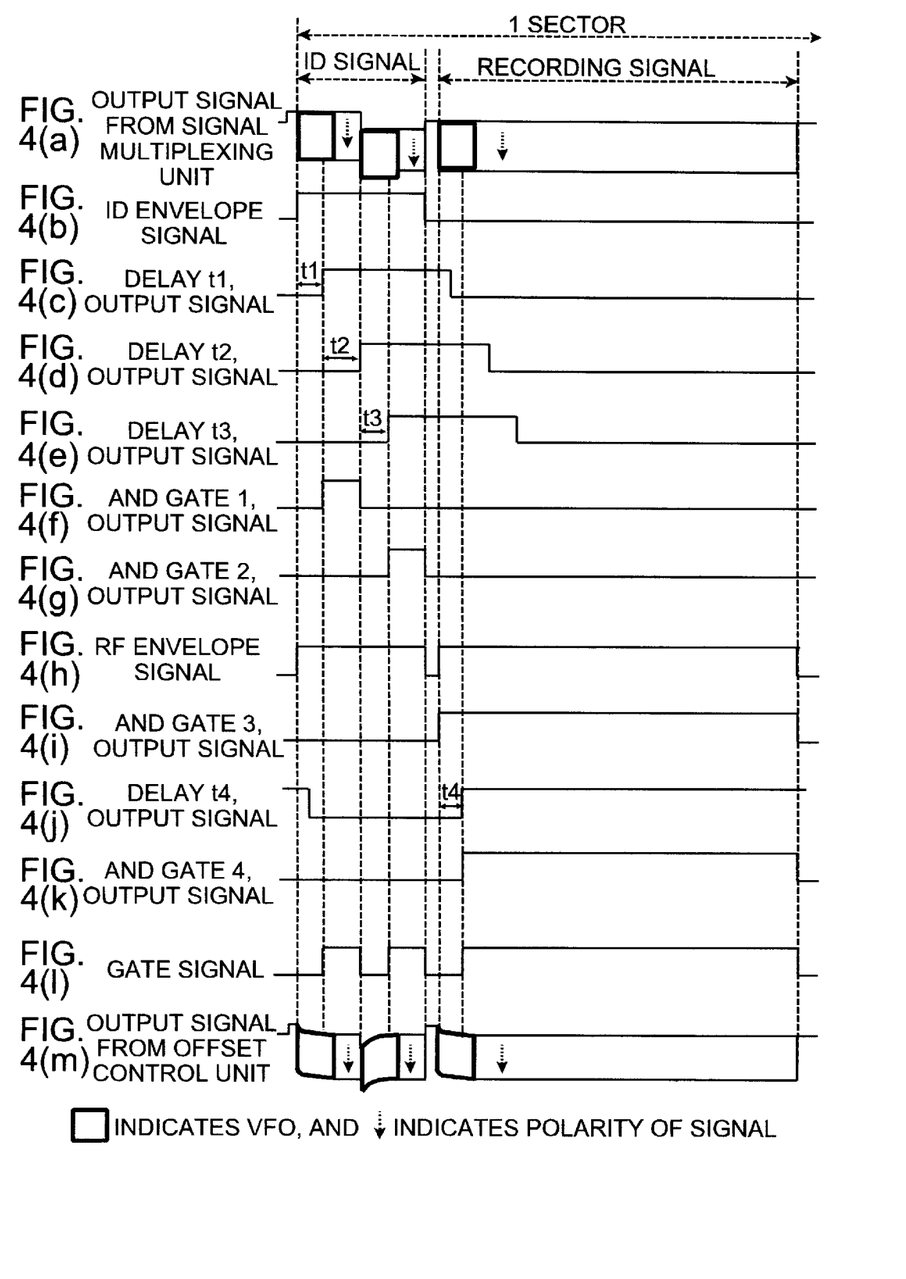

A practical example of the gate generation unit 46 is shown in FIGS. 1 and 4.

FIG. 4 shows the signal waveform indicating the operations of the gate generation unit 46. The gate generation unit 46 comprises a plurality of delay elements, AND gates, and OR gates. The ID envelope signal 9, one of the input signals of the gate generation unit 46 is input to the delay t1, the delay t2, and the delay t3 sequentially. The ID envelope signal 9 is shown by (b) in FIG. 4, a delay t1 output signal 47 is shown by (c) in FIG. 4, a delay t2 output signal 48 is shown by (d) in FIG. 4, and a delay t3 output signal 49 is indicated by (e) in FIG. 4. The ID envelope signal of each of them is sequentially delayed.

An output signal 51 of an AND gate 1 (50) is shown by (f) in FIG. 4, and an output signal 53 of an AND gate 2 (52) is shown by (g) in FIG. 4. The ID envelope signal 9 and another input signal, that is, the RF envelope signal 23 are input to an AND gate 3 (54), and the ID signal portion of the RF envelope signal 23 is removed.

An output signal 55 of the AND gate 3 (54) is input to the delay t4, and obtains a delay t4 output signal 56. The output signal 55 and the delay t4 output signal 56 are input to an AND gate 4 (57), and obtains an AND gate 4 output signal 58.

At this time, the RF envelope signal 23 is shown by (h) in FIG. 4, the output signal 55 of the AND gate 3 is shown by (i) in FIG. 4, the delay t4 output signal 56 is shown by (j) in FIG. 4, and the AND gate 4 output signal 58 is shown by (k) in FIG. 4.

Last, the output signal 51 of the AND gate 1, the output signal 53 of the AND gate 2, and the output signal 58 of the AND gate 4 are input to an OR gate 59, and generate the gate signal 38. The gate signal 38 is shown by (1) in FIG. 4 or (h) in FIG. 3.

As described above, in the optical disk device according to the present embodiment 1, the polarity of the ID signal contained in the difference signal 7 is switched and output by the polarity switching unit 29 according to the polarity signal 15. The ID signal contained in the output signal 30 from the polarity switching unit 29 and the recording signal contained in the sum signal 22 are selected and output by the signal multiplexing unit 34 according to the ID envelope signal 9. The offset control unit 37 can control and maintain the constant DC level of the output signal 35 of the signal multiplexing unit 34 using the gate signal 38 generated by the gate generation unit 46. Described below are the preferable numeric parameters of the offset control unit 37 and the gate generation unit 46. Assume that a record/regeneration parameter of the above described optical disk is used, and that the length of the VFO is 18 μs. Also assume that the cut-off frequency of the high-speed response high-pass filter comprising the capacitor 41 and the resistor 43 shown in the practical example of the offset control unit 37 is 300 KHz, and that the cut-off frequency of the low-speed response high-pass filter comprising the capacitor 41 and the resistor 42 is 1 KHz. The delay time of the delay t1, t3, and t4 shown by the practical example of the gate generation unit 46 is 5 µs, and the delay time of the delay t2 is 28 µs. Using these parameters, the offset control unit 37 can complete the implementation of the high-speed DC offset at the VFO leading period, thereby maintaining a stable DC level at the second half portion including effective data.

The parameters are not limited to the above listed parameters, but amendments can be made to the parameters within a predetermined range to realize the present embodiment. Furthermore, the record/regeneration parameter of an optical disk, for example, with different recording line density or regeneration line speed, and furthermore with a different length of the VFO, can be applicable by changing in proportion to or inversely proportion to the differences the cut-off frequency of each filter or the delay time of the delay unit.

With the above described configuration and operations, the ID signal and the recording signals are multiplexed according to the sum signal and the difference signal regenerated by a rewritable optical disk, thus obtaining the DC-level adjusted signal 39. The output signal 39 of the offset control unit 37 is input to an A/D converter 62 through an automatic amplitude control circuit (AGC) and an equalizer (EQL) 60. The A/D converter 62 converts the input signal into a multi-bit digital signal 63 by making the most of the dynamic range of the input signal.

According to the first embodiment, the functions are effective by the AGC/EQL process before the A/D conversion, but the functions can also be effective in the digital signal process after the A/D conversion. However, to minimize the number of the bits of the A/D converter, an analog process before the A/D conversion is preferred as in the present embodiment.

Second Embodiment

Figures 5A, 5K:
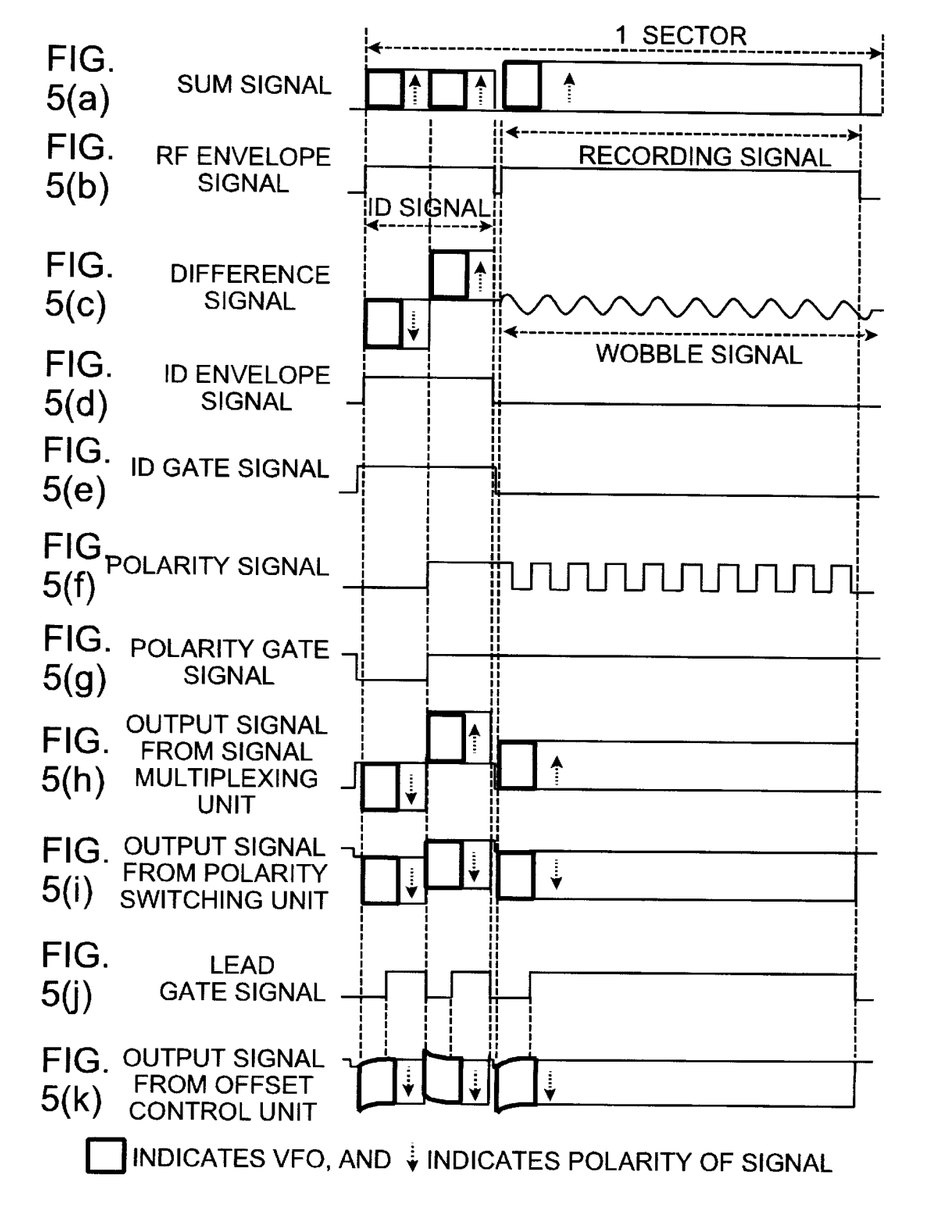

First, the optical disk device according to the second embodiment is shown when the ID signal is selected from a difference signal. FIG. 5 shows a signal waveform.

Figure 2:
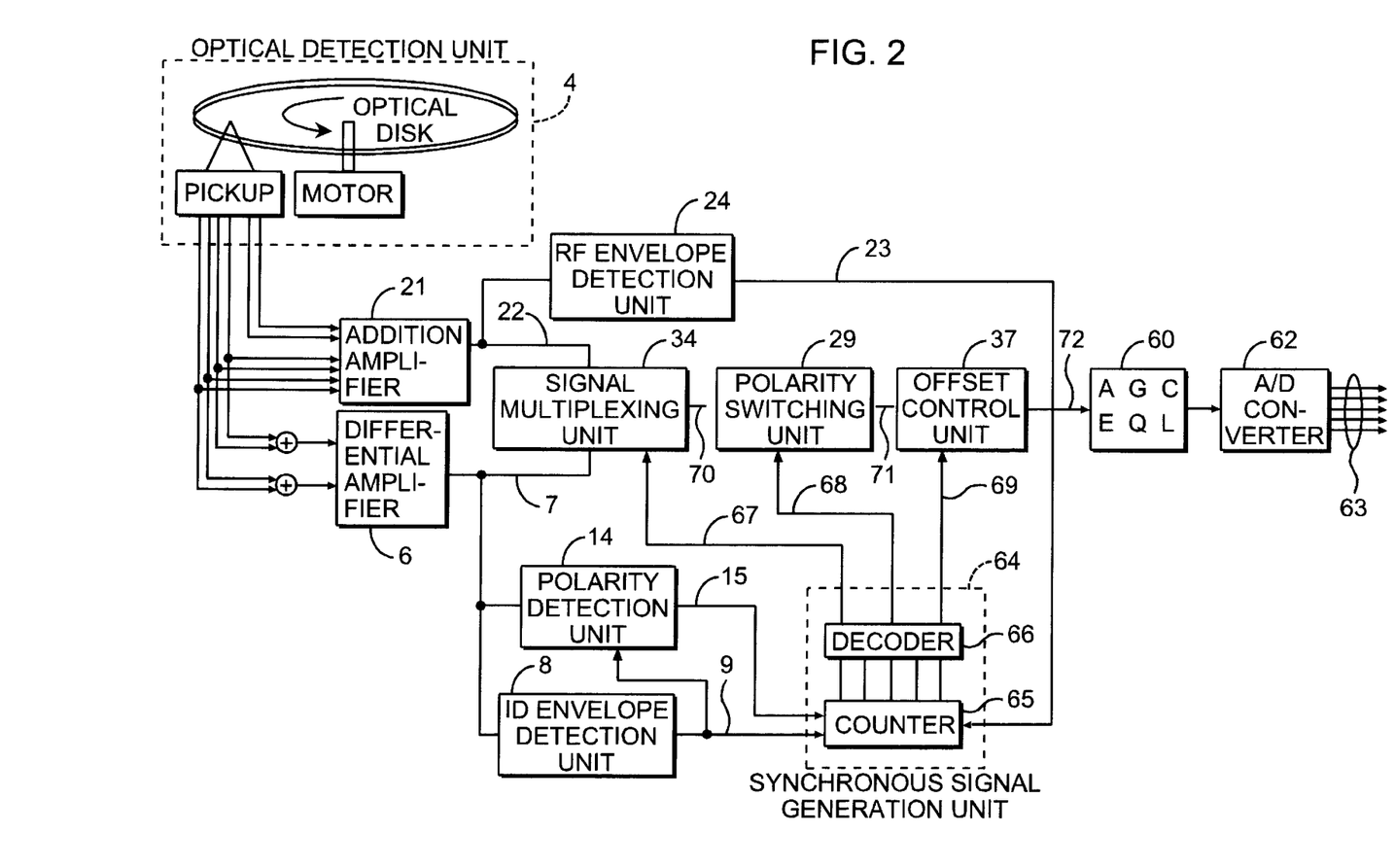
FIG. 2 shows the configuration of an optical disk device according to a second embodiment of the present invention.
Figure 3A:
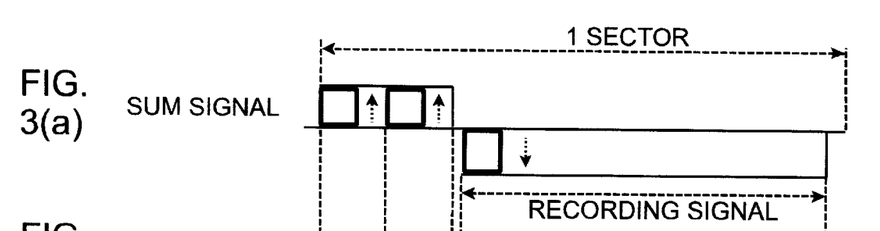
Figures 3B, 3C:
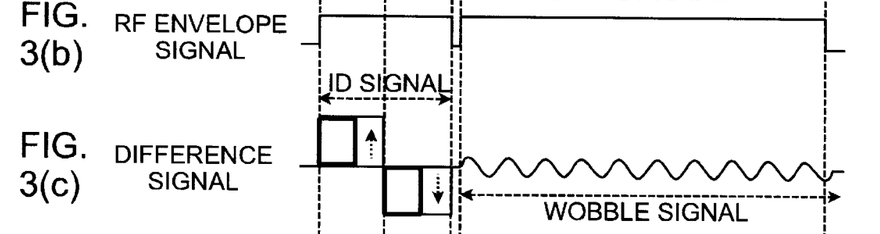
Figure 3D:
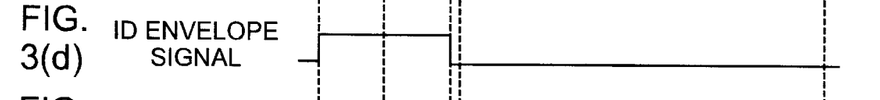
Figure 3E:
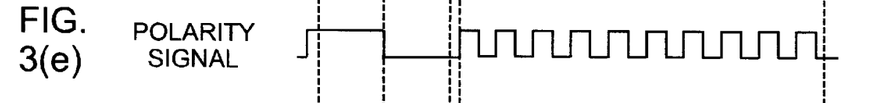
Figure 3F:
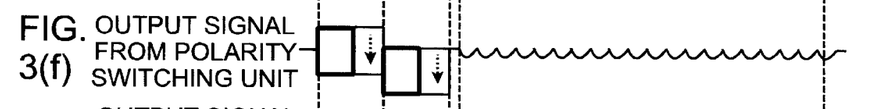
Figure 3G:
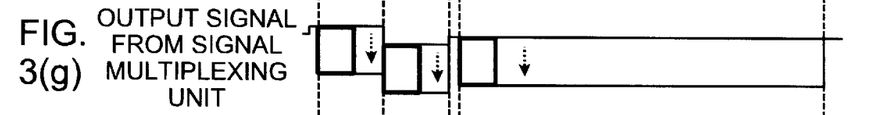
Figure 3H:
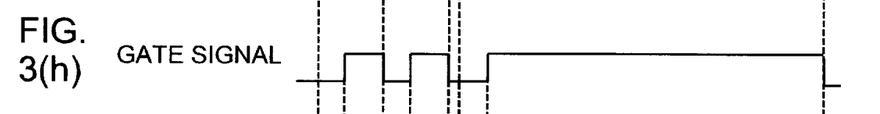
Figure 3I:
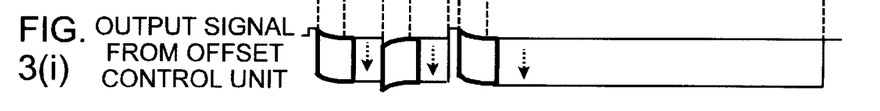

The description of the common configuration with the first embodiment is omitted here, and only the features of the second embodiment which are different from those of the first embodiment are described below. In FIG. 2, the block assigned the same number as in FIG. 1 has the same function as in the first embodiment.

In FIG. 2, the optical detection unit 4 converts a signal recorded on an optical disk into a plurality of electric signals and outputs them. The difference signal 7 is generated by the differential amplifier 6. The difference signal 7 is, as shown by (c) in FIG. 5. preceded by an ID signal, and is followed by a warble signal having a single frequency. The ID signal has two portion having opposite polarities, and indicates an inverse polarity to the first embodiment. The difference signal 7 is input to the ID envelope detection unit 8, and outputs the ID envelope signal 9. The ID envelope signal 9 is shown by (d) in FIG. 5. The difference signal 7 and the ID envelope signal 9 are input to the polarity detection unit 14, and outputs the polarity signal 15. The polarity signal 15 is shown by (f) in FIG. 5.

Next, the addition amplifier 21 generates the sum signal 22. The sum signal 22 is, as shown by (a) in FIG. 5, preceded by an ID signal, and is followed by data recorded in the crystal/non-crystal state on the recording track of the land or the groove. According to the second embodiment, the polarity of the recording signal is opposite the polarity of that in the first embodiment. In FIG. 2, the sum signal 22 is input to the RF envelope detection unit 24, and outputs the RF envelope signal 23.

Described below is a synchronous signal generation unit 64.

The synchronous signal generation unit 64 receives the ID envelope signal 9, the polarity signal 15, and the RF envelope signal 23, and generates an ID gate signal 67 used by the signal multiplexing unit 34, a polarity gate signal 68 used by the polarity switching unit 29, and a lead gate signal 69 used by the offset control unit 37.

The synchronous signal generation unit 64 uses the ID envelope signal 9, polarity signal 15, or RF envelope signal 23 at each rise time as a preset input, and comprises a counter 65 for continuously counting one sector, and a decoder 66 for generating a gate signal synchronous with the counter by decoding the counter output. The ID gate signal 67 indicates the high level in the range containing the ID signal of the sum signal (a) or the difference signal (c) as shown by (e) in FIG. 5.

The polarity gate signal 68 is a signal indicating the high/low level of the polarity of an ID signal or a recording signal. The lead gate signal 69 indicates the low level at the first half portion of the VFO signal at the start of the ID signal or the recording signal of the output signal (i) of the polarity switching unit 29, and indicates the high level at the second half portion through effective data as shown by (j) in FIG. 5.

The difference between the ID envelope signal 9 and the ID gate signal 67, the polarity signal 15 and the polarity gate signal 68, and the gate signal 38 of the first embodiment and the lead gate signal 69 of the second embodiment is that the ID envelope signal 9, the polarity signal 15, and the gate signal 38 are the signals directly detected from an optical disk or obtained by combining these signals while the ID gate signal 67, the polarity gate signal 68, and the lead gate signal 69 are the signals indirectly generated through synchronous regeneration using a counter. That is, when a defect (missing a signal due to a scratch, etc.) occurs on an optical disk, the former signals cannot be correct signals, but the latter signals can constantly be correct signals by the interpolating functions.

Described below is the signal multiplexing unit 34.

The signal multiplexing unit 34 receives the difference signal 7 and the sum signal 22. The ID gate signal 67 selects the signals, multiplexes them into one signal, and outputs an output signal 70. As a result, the ID signal of the input difference signal (c) is multiplexed and output when the ID gate signal (e) indicates the high level, and the recording signal o f the input sum signal (a) is multiplexed and output as the output signal 70 as shown by (h) in FIG. 5.

Next, the polarity switching unit 29 receives the output signal 70 from the signal multiplexing unit 34, and output an output signal 71 by switching the polarity of the signal using the polarity gate signal 68. As a result, the output signal 71 is a signal obtained by inverting the output signal (h) of the signal multiplexing unit 34 input when the polarity gate signal (g) indicates the high level as shown by (i) in FIG. 5. The direction of the polarity of the ID signal which has indicated bi-polarity, and the polarity of the recording signal is adjusted in the same direction.

Described below is the offset control unit 37.

The offset control unit 37 receives the output signal 71 having the adjusted polarity of the output signal 70 of the signal multiplexing unit 34, and outputs the output signal 72 in which the DC level of the effective data portion of a signal is controlled and maintained to be constant according to the lead gate signal 69. As a result, the output signal 72 is received with a quick response of the offset unit into a predetermined DC level at the VFO portion at the head of the ID signal or the recording signal when the lead gate signal (j) indicates the low level, and a predetermined DC level is maintained with a slow response at the effective data portion of the ID signal or the recording signal when the lead gate signal (j) indicates the high level as shown by (k) in FIG. 5.

As described above, in the optical disk device according to the second embodiment, the signal multiplexing unit 34 selects and outputs the ID signal contained in the difference signal 7 and the recording signal contained in the sum signal 22 according to the ID gate signal 67. The polarity switching unit 29 switches and outputs the polarity of the ID signal and the recording signal contained in the output signal 70 from the signal multiplexing unit 34 according to the polarity gate signal 68. The offset control unit 37 controls and maintains the constant DC level of the output signal 71 of the polarity switching unit 29 according to the lead gate signal 69.

With the above described configuration and operations, the ID signal and the recording signals are multiplexed according to the sum signal and the difference signal regenerated by a rewritable optical disk, thus obtaining the DC-level adjusted output signal 72. The output signal 72 of the offset control unit 37 is input to an A/D converter 62 through an automatic amplitude control circuit (AGC) and an equalizer (EQL) 60.

The A/D converter 62 converts the input signal into a multi-bit digital signal 63 by making the most of the dynamic range of the input signal. According to the second embodiment, the functions are effective by the AGC/EQL process before the A/D conversion, but the functions can also be effective in the digital signal process after the A/D conversion. However, to minimize the number of the bits of the A/D converter, an analog process before the A/D conversion is preferred as in the present embodiment.

The synchronous signal generation unit 64 in the second embodiment can be applied to the first embodiment to obtain an ID envelope signal, a polarity signal, and a gate signal.

According to the second embodiment, the ID signal is obtained from the difference signal, but the ID signal is also contained in a sum signal (tracking signal, full-addition signal), and can be selected by the signal multiplexing unit during the ID period.

Figure 10A:
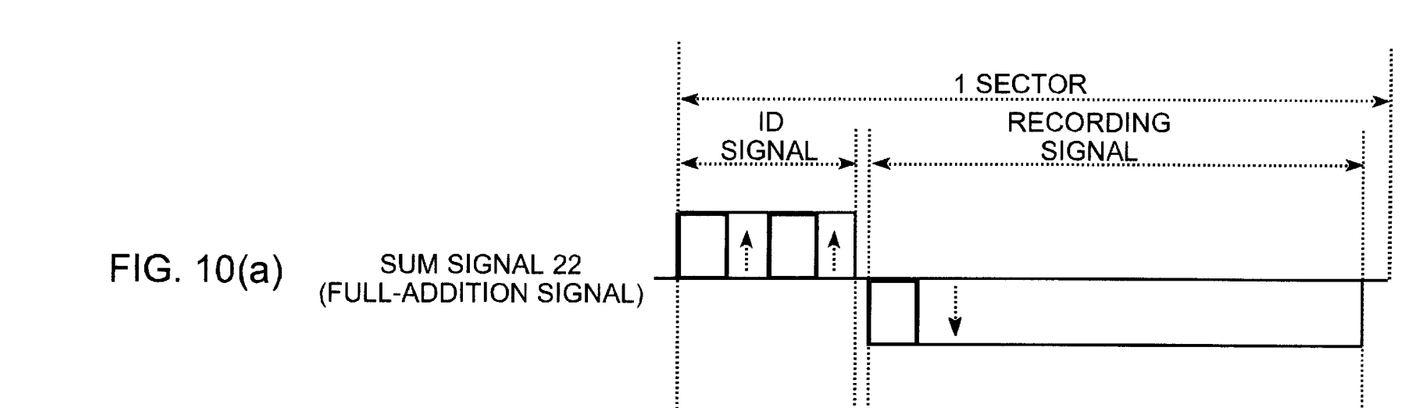
Figure 10B:
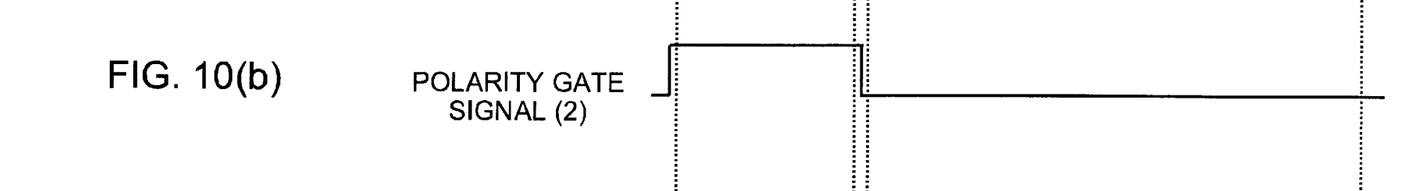
Figure 10C:
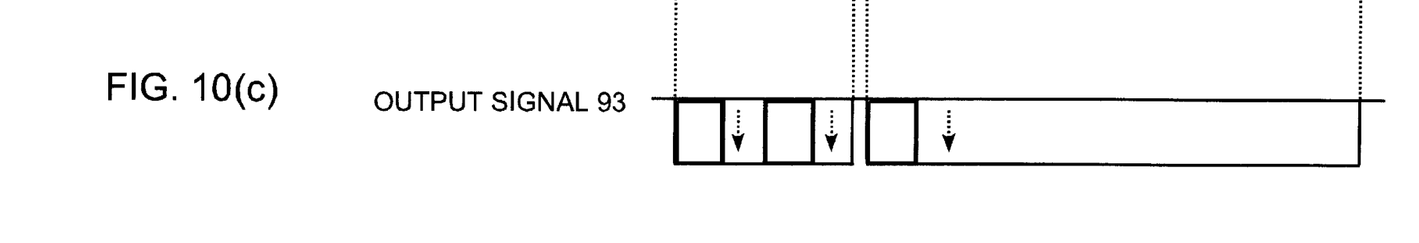

When the ID signal is selected from the sum signal (full-addition signal), the control signal should be modified in the same configuration as the optical disk device shown in FIG. 2. When the sum signal shown by (a) in FIG. 5 is input, the signal multiplexing unit 34 constantly selects a sum signal by fixing the ID gate signal 67 at the low level. Since the ID signal has the same polarity as the recording signal, the polarity of the ID signal can be inverse to the polarity of the recording signal by fixing the polarity gate signal 68 at the high level. Similarly, when the sum signal shown by (a) in FIG. 10 is input, the signal multiplexing unit 34 constantly selects a sum signal 32 by fixing the ID gate signal 67 at the low level. Since the ID signal has the opposite polarity to the recording signal, the polarity of the ID signal can be inverted to match the polarity of the recording signal by setting the polarity gate signal 68 to the high level during the ID period as shown by (b) in FIG. 10. That is, the optical disk device according to the second embodiment, the ID signal can be selected from either a difference signal or a sum signal.

Described below are the third embodiment in which an ID signal is obtained from a tracking signal, and the fourth embodiment in which an ID signal is obtained from a full-addition signal with another configuration.

Third Embodiment

Figure 6:
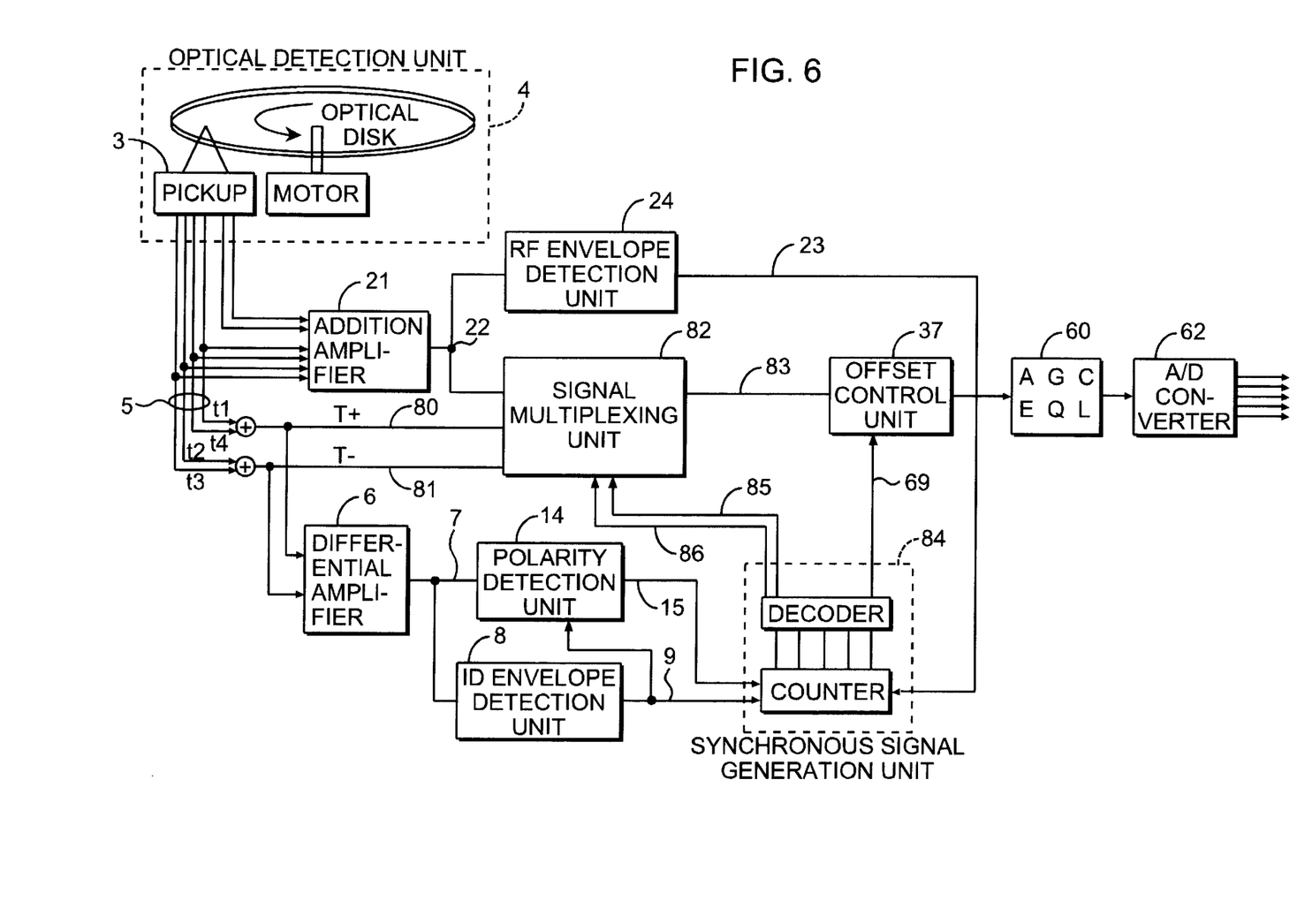
FIG. 6 shows the configuration of an optical disk device according to a third embodiment of the present invention.
Figures 8A, 8B, 8C:
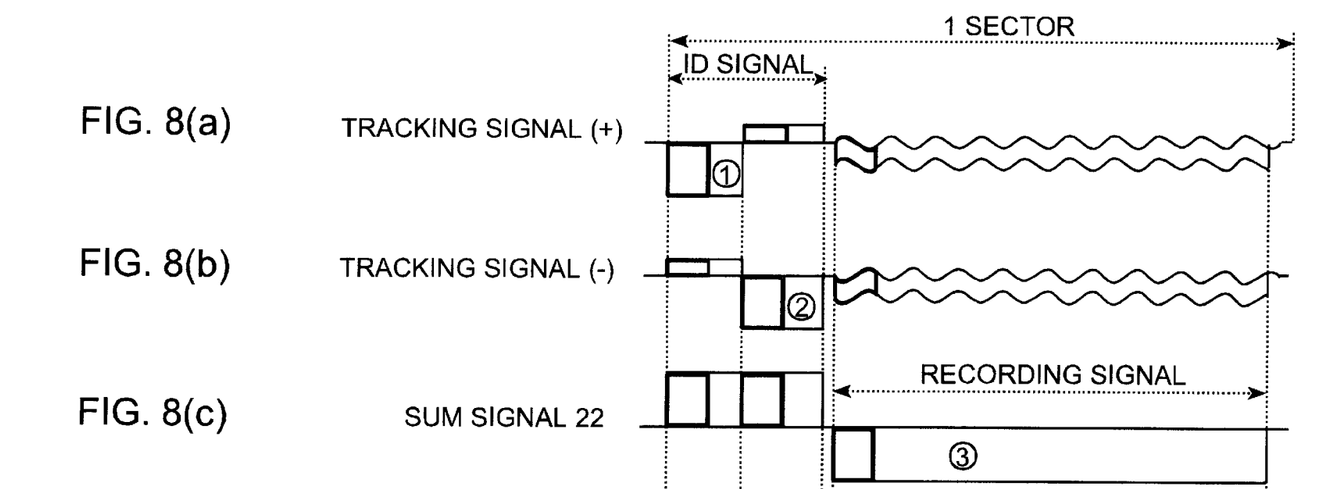
Figures 8D, 8E:
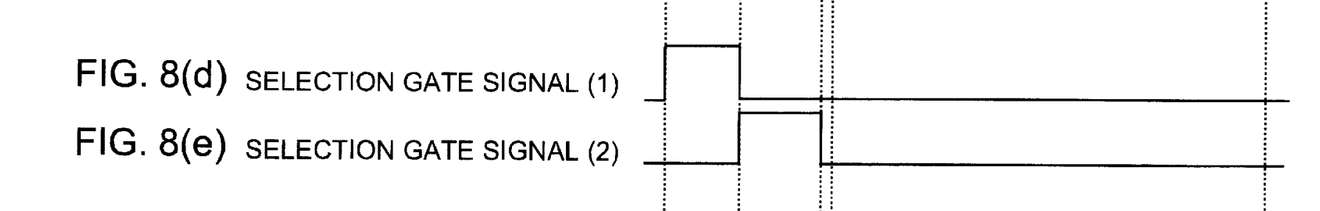
Figure 8F:
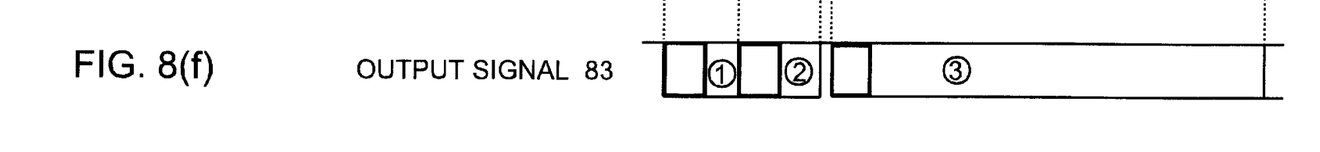

FIG. 6 shows the optical disk device according to the third embodiment of the present invention. FIG. 8 shows the signal waveform of the device.

In the third embodiment, the common portions with the above described second embodiment are removed from the descriptions, and only different portions are described below. In FIG. 6, the block having the same number as in FIG. 2 has the same function as in the second embodiment.

In FIG. 6, the optical detection unit 4 converts a signal recorded on an optical disk into a plurality of electric signals. The method of detecting the tracking signal 5 is described below.

Figure 7:
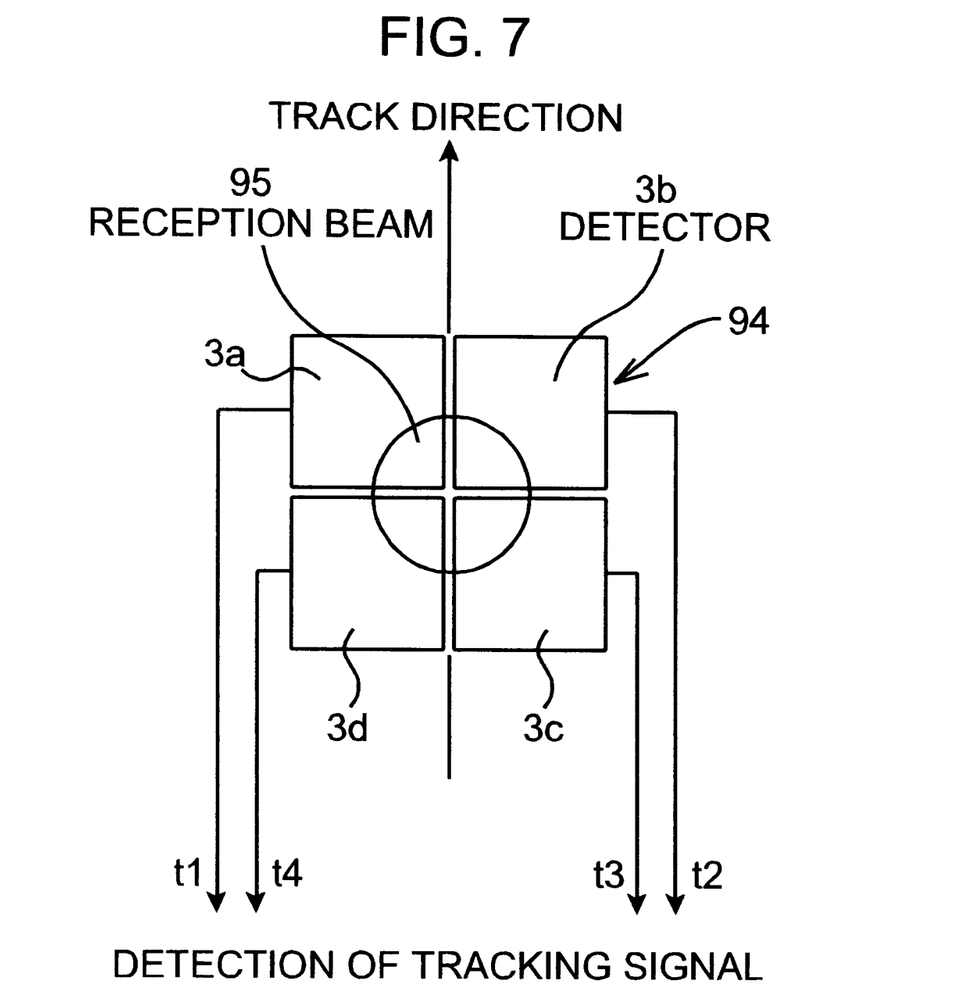
FIG. 7 shows the configuration of a pickup according to the third embodiment of the present invention.

As shown in FIG. 7, a division detector 94 comprising detectors 3a through 3d provided close to each other is used as the pickup 3. A reception beam 95 is provided between the detectors. The signal for detecting the four detectors are output as signals t1 through t4.

In FIG. 6, a tracking signal (+) 80 is obtained by adding the t1 and t4, and a tracking signal (−) 81 is obtained by adding t2 and t3. The signals have the waveforms (a) and (b) respectively.

Described below is a synchronization signal generation unit 84.

The synchronization signal generation unit 84 receives the ID envelope signal 9, the polarity signal 15, and the RF envelope signal 23, and generates a selection gate signal (1) 85 and a selection gate signal (2) 86 used by a signal multiplexing unit 82, and the lead gate signal 69 used by the offset control unit 37. The selection gate signal (1) 85 is a signal indicating the high level at the first half of the ID signal of the tracking signal (+) as shown by (d) in FIG. 8. The selection gate signal (2) 86 is a signal indicating the high level at the second half of the ID signal of the tracking signal (−) as shown by (e) in FIG. 8.

Described below is the signal multiplexing unit 82.

The signal multiplexing unit 82 receives the sum signal 22, the tracking signal (+) 80, and the tracking signal (−) 81, and outputs an output signal 83 obtained by selecting an input signal from the selection gate signals (1) and (2) and multiplexing them into one signal.

The output signal 83 shown by (f) in FIG. 8 is obtained as a result of selecting the first half of the ID signal of the input tracking signal (+) when the selection gate signal (1) indicates the high level, the second half of the ID signal of the input tracking signal (−) when the selection gate signal (2) indicates the high level, and the recording signal of the input sum signal 22 when the selection gate signals (1) and (2) indicate the low level.

As described above, in the optical disk device according to the third embodiment of the present invention, the output signal 83 obtained by multiplexing an ID signal and an recording signal is obtained by selecting and outputting the ID signal contained in the tracking signal, which is a type of a sum signal, and the recording signal contained in the sum signal 22 (full-addition signal) by the signal multiplexing unit 82 according to the selection gate signals 85 and 86.

According to the third embodiment of the present invention, the ID signal reading error can be reduced even if the tilt between the optical disk 1 and the pickup 3 is not regulated in the optical detection unit 4.

Fourth embodiment

Figure 9:
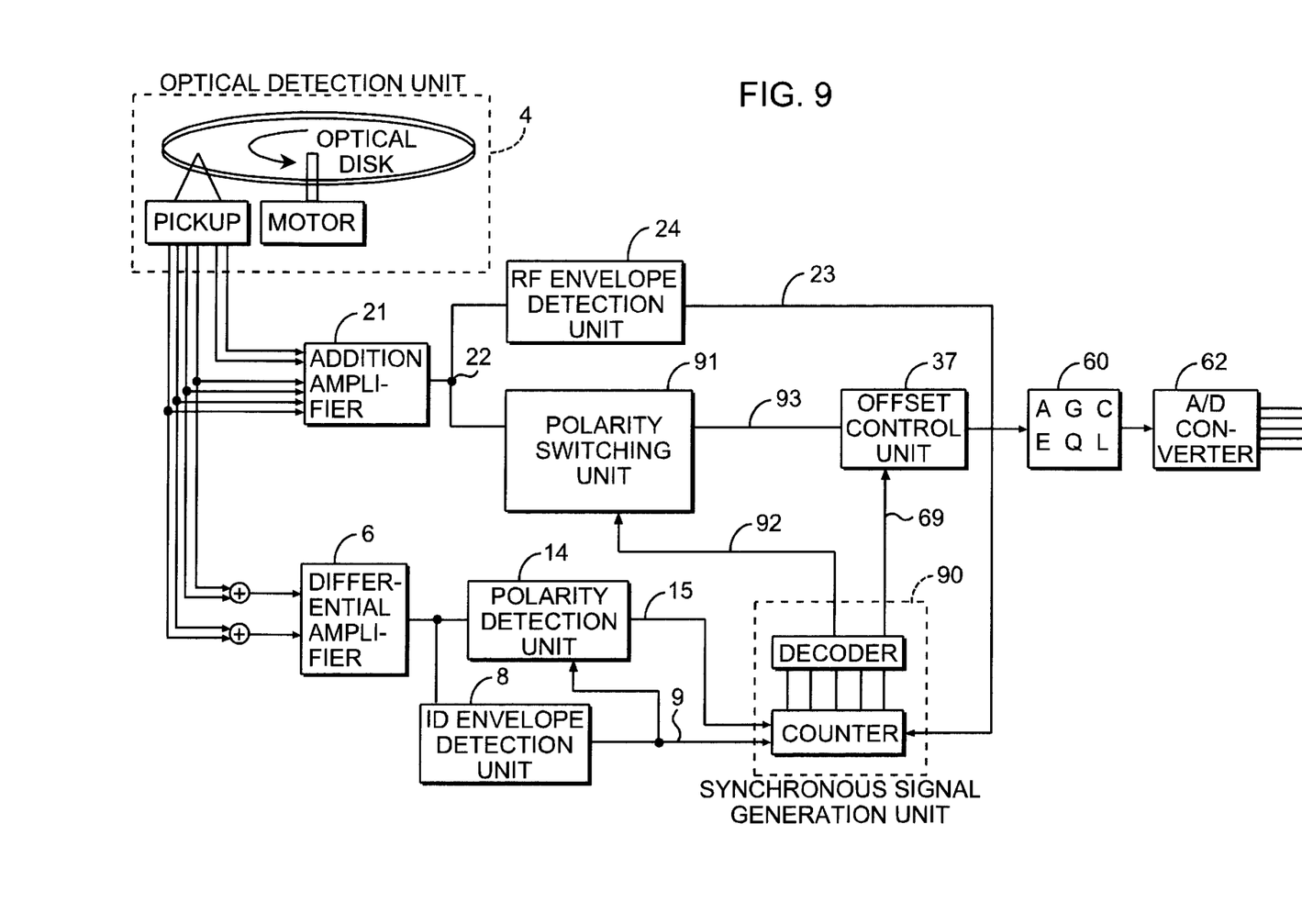
FIG. 9 shows the configuration of an optical disk device according to a fourth embodiment of the present invention.

FIG. 9 shows the optical disk device of the fourth embodiment of the present invention. FIG. 10 shows the waveform of the signal.

The description of the common portions between the fourth embodiment and the above described second embodiment is omitted here, and only the different features are described below. In FIG. 9, the block assigned the same number as in FIG. 2 indicates the same function as in the second embodiment.

In FIG. 9, the optical detection unit 4 converts a signal recorded on an optical disk into a plurality of electric signals and outputs them. The plurality of electric signals are added together by the addition amplifier 21 and outputs the sum signal 22 as shown by (a) in FIG. 10.

Described next is a synchronization signal generation unit 90.

The synchronization signal generation unit 90 receives the ID envelope signal 9, the polarity signal 15, and the RF envelope signal 23, and generates a polarity gate signal (2) 92 used by a polarity switching unit 91, and the lead gate signal 69 used by the offset control unit 37. The polarity gate signal (2) 92 is a signal indicating the high level at the ID signal portion of the sum signal 22 as shown by (b) in FIG. 10.

Described below is the polarity switching unit 91.

The polarity switching unit 91 receives the sum signal 22, and outputs an output signal 93 by inverting the polarity of the input signal according to the polarity gate signal (2). As shown by (c) in FIG. 10, the output signal 93 is output with the polarity of the ID signal of the input sum signal 22 inverted when the polarity gate signal (2) indicates the high level, and with the polarity of the recording signal of the sum signal 22 remaining unchanged when the polarity gate signal indicates the low level.

As described above, the optical disk device according to the present embodiment can output the ID signal and the recording signal contained in the sum signal 22 (full-addition signal) with the polarity of each signal adjusted by the polarity switching unit 91.

According to the present embodiment, the ID signal reading error can be reduced even if there is a large focus control error between the optical disk 1 and the pickup 3 in the optical detection unit 4.

As described above, the present invention can reduce the dynamic range of the precedent circuit (for example, an AGC, an equalizer, etc.) before the A/D conversion to the optical disk device, and one A/D converter having the minimal number of bits can be used for digitization in the use for converting a regenerated signal of the optical disk device using a sum signal and a difference signal of a plurality of electric signals detected by the optical detection unit into a multi-bit digital signal. Therefore, the A/D converter and the device can be easily designed at a lower cost of the entire device. Using the present invention, a reading error improving method can be introduced by optimal decoding to the optical disk device.

What is claimed is:

1. A method of processing a signal of an optical disk using a sum signal or a difference signal of a plurality of electric signals detected by optical detection means, comprising the steps of:

selecting and time-multiplexing an ID signal and a recording signal contained in the sum signal or the difference signal;

adjusting a polarity of the ID signal to a polarity of the recording signal;

controlling and maintaining constant DC levels of a polarity-adjusted ID signal and the recording signal;

processing the ID signal and the recording signal into a series of polarity and DC level adjusted signals; and A/D converting the series of signals.

2. The method of processing a signal of an optical disk according to claim 1, wherein the ID signal contained in the difference signal and the recording signal contained in the sum signal are selected and time-multiplexed.

3. The method of processing a signal of an optical disk according to claim 1, wherein the ID signal contained in the difference and sum signals and the recording signal contained in the sum signal are selected and time-multiplexed.

4. An optical disk device comprising:

optical detection means for divisionally detecting a reflected light from a disk, and outputting a plurality of electric signals;

operation means for generating a sum signal and a difference signal from the plurality of electric signals;

signal multiplexing means for selecting an ID signal and a recording signal from the sum signal or the difference signal, and time-multiplexing the selected signals;

polarity switching means for adjusting a polarity of the ID signal to a polarity of the recording signal;

offset control means for controlling and maintaining constant DC levels of the polarity-adjusted ID signal and recording signal; and an A/D converter for digitizing a series of polarity- and DC-level adjusted ID signals and recording signals.

5. The optical disk device according to claim 4, wherein said signal multiplexing means selects an ID signal from a difference signal, and a recording signal from a sum signal, and time-multiplexes the signals selected.

6. The optical disk device according to claim 4, wherein said signal multiplexing means selects an ID signal from a difference signal and a sum signal, and a recording signal from a sum signal, and time-multiplexes the signals selected.

* * * * *